United States Patent
Imamura et al.

(10) Patent No.: US 9,771,065 B2
(45) Date of Patent: Sep. 26, 2017

(54) VEHICLE CONTROL SYSTEM

(71) Applicant: TOYOTA JIDOSHA KABUSHIKI KAISHA, Toyota-shi, Aichi-ken (JP)

(72) Inventors: Tatsuya Imamura, Toyota (JP); Atsushi Tabata, Toyota (JP); Toshiki Kanada, Toyota (JP); Tooru Matsubara, Toyota (JP); Yasuhiro Hiasa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/913,779

(22) PCT Filed: Aug. 27, 2014

(86) PCT No.: PCT/JP2014/073119
§ 371 (c)(1),
(2) Date: Feb. 23, 2016

(87) PCT Pub. No.: WO2015/037480
PCT Pub. Date: Mar. 19, 2015

(65) Prior Publication Data
US 2016/0264128 A1 Sep. 15, 2016

(30) Foreign Application Priority Data
Sep. 12, 2013 (JP) .................................. 2013-189397

(51) Int. Cl.
*B60K 6/44* (2007.10)
*B60W 20/40* (2016.01)
(Continued)

(52) U.S. Cl.
CPC ............. *B60W 20/40* (2013.01); *B60K 6/442* (2013.01); *B60K 6/445* (2013.01); *B60W 10/02* (2013.01);
(Continued)

(58) Field of Classification Search
CPC ......... F16H 47/08; B60W 20/40; B60K 41/02
See application file for complete search history.

(56) References Cited

U.S. PATENT DOCUMENTS 5,954,607 A * 9/1999 Nitsche .................. F16D 33/06
475/42
6,520,884 B2 * 2/2003 Ooyama ............... F16H 37/086
475/216
(Continued)

FOREIGN PATENT DOCUMENTS

JP H10-54263 A 2/1998
JP 2008-222147 A 9/2008
(Continued)

*Primary Examiner* — Jonathan M Dager
*Assistant Examiner* — Alex C Dunn
(74) *Attorney, Agent, or Firm* — Oliff PLC

(57) ABSTRACT

A vehicle control system for reducing shocks resulting from restarting an engine under EV running mode. The vehicle control system is applied to a vehicle including an engagement device that selectively connect the engine with the powertrain, and a motor adapted to generate a drive force and connected with the powertrain. In the vehicle, a first mode is selected to propel the vehicle by the motor while interrupting the torque transmission between the engine and the powertrain and stopping the engine, and a second mode is selected to propel the vehicle by the motor while allowing the torque transmission between the engine and the powertrain and stopping the engine. The vehicle control system selects the second mode if a control response of at least any of the engagement device and the motor is estimated to be out of a predetermine range when the vehicle is running while stopping the engine.

8 Claims, 7 Drawing Sheets

(51) Int. Cl.
  *B60K 6/445*   (2007.10)
  *B60W 10/02*   (2006.01)
  *B60W 10/06*   (2006.01)
  *B60W 10/08*   (2006.01)
  *B60K 6/442*   (2007.10)
  *B60W 10/10*   (2012.01)
  *B60K 6/387*   (2007.10)

(52) U.S. Cl.
  CPC .......... *B60W 10/06* (2013.01); *B60W 10/08* (2013.01); *B60W 10/10* (2013.01); *B60K 6/387* (2013.01); *B60W 2510/0291* (2013.01); *B60W 2510/087* (2013.01); *B60Y 2200/92* (2013.01); *B60Y 2300/182* (2013.01); *B60Y 2300/192* (2013.01); *B60Y 2300/43* (2013.01); *B60Y 2300/60* (2013.01); *B60Y 2300/70* (2013.01); *B60Y 2400/406* (2013.01); *B60Y 2400/80* (2013.01); *Y02T 10/6239* (2013.01); *Y02T 10/6286* (2013.01); *Y10S 903/914* (2013.01); *Y10S 903/93* (2013.01)

(56) References Cited

U.S. PATENT DOCUMENTS

| | | | | |
|---|---|---|---|---|
| 7,164,247 | B2* | 1/2007 | Joe | B60K 6/445 180/65.22 |
| 7,846,064 | B2* | 12/2010 | Hornbrook | F16D 65/14 477/116 |
| 8,298,105 | B2* | 10/2012 | Kajigai | B60K 6/365 475/35 |
| 8,591,360 | B2* | 11/2013 | Kawasaki | B60K 6/48 475/210 |
| 9,126,600 | B2* | 9/2015 | Iizuka | F16H 61/0437 |
| 2003/0153429 | A1* | 8/2003 | Boll | B60K 6/442 477/6 |
| 2015/0021110 | A1 | 1/2015 | Ono et al. | |

FOREIGN PATENT DOCUMENTS

| | | |
|---|---|---|
| JP | 2010-000858 A | 1/2010 |
| JP | 5141802 B2 | 2/2013 |
| WO | 2013/114594 A1 | 8/2013 |

* cited by examiner

[Fig. 1]
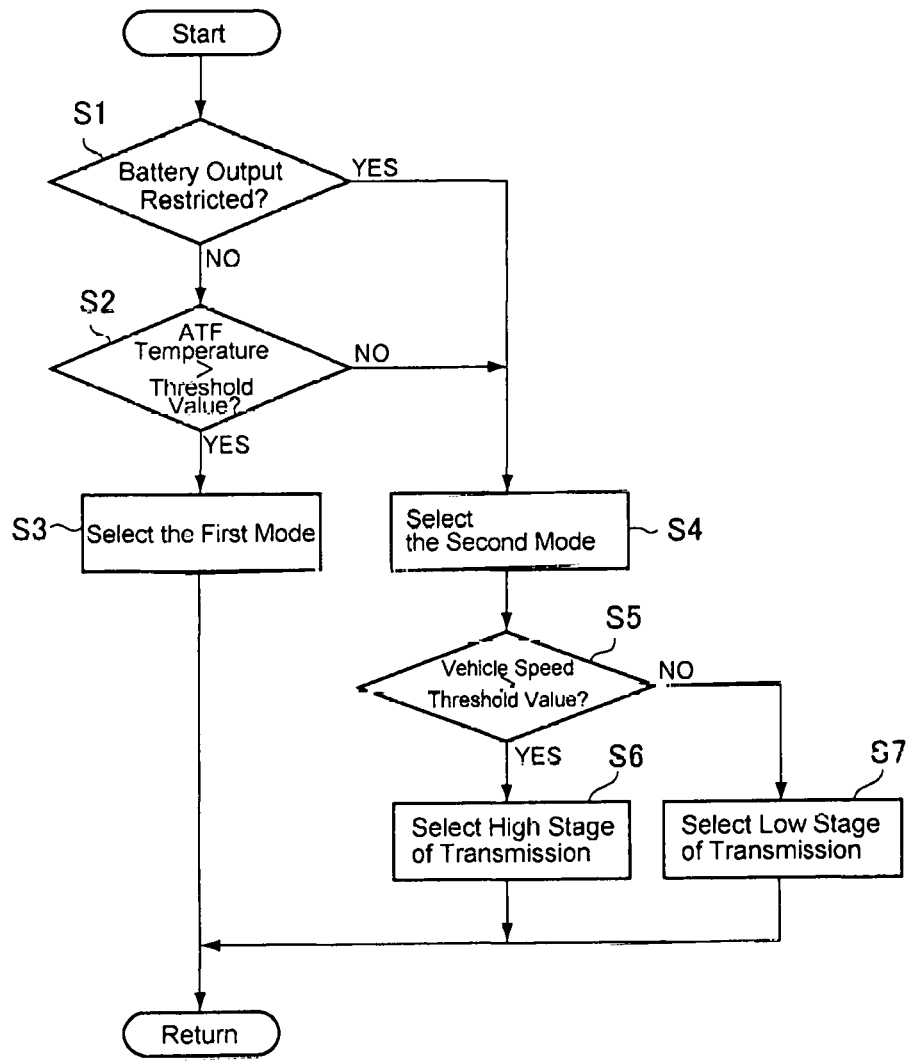

[Fig. 2]
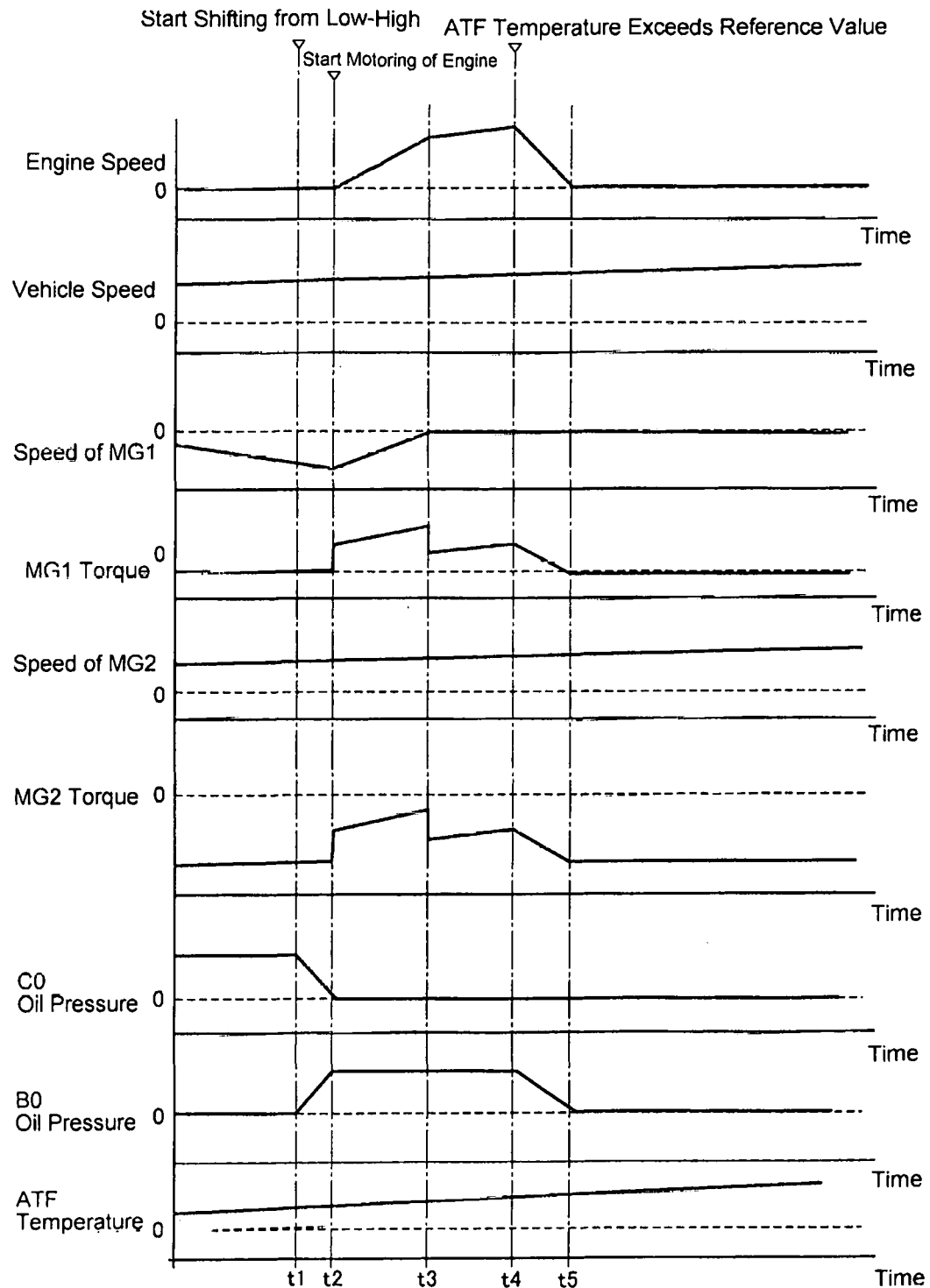

[Fig. 3]
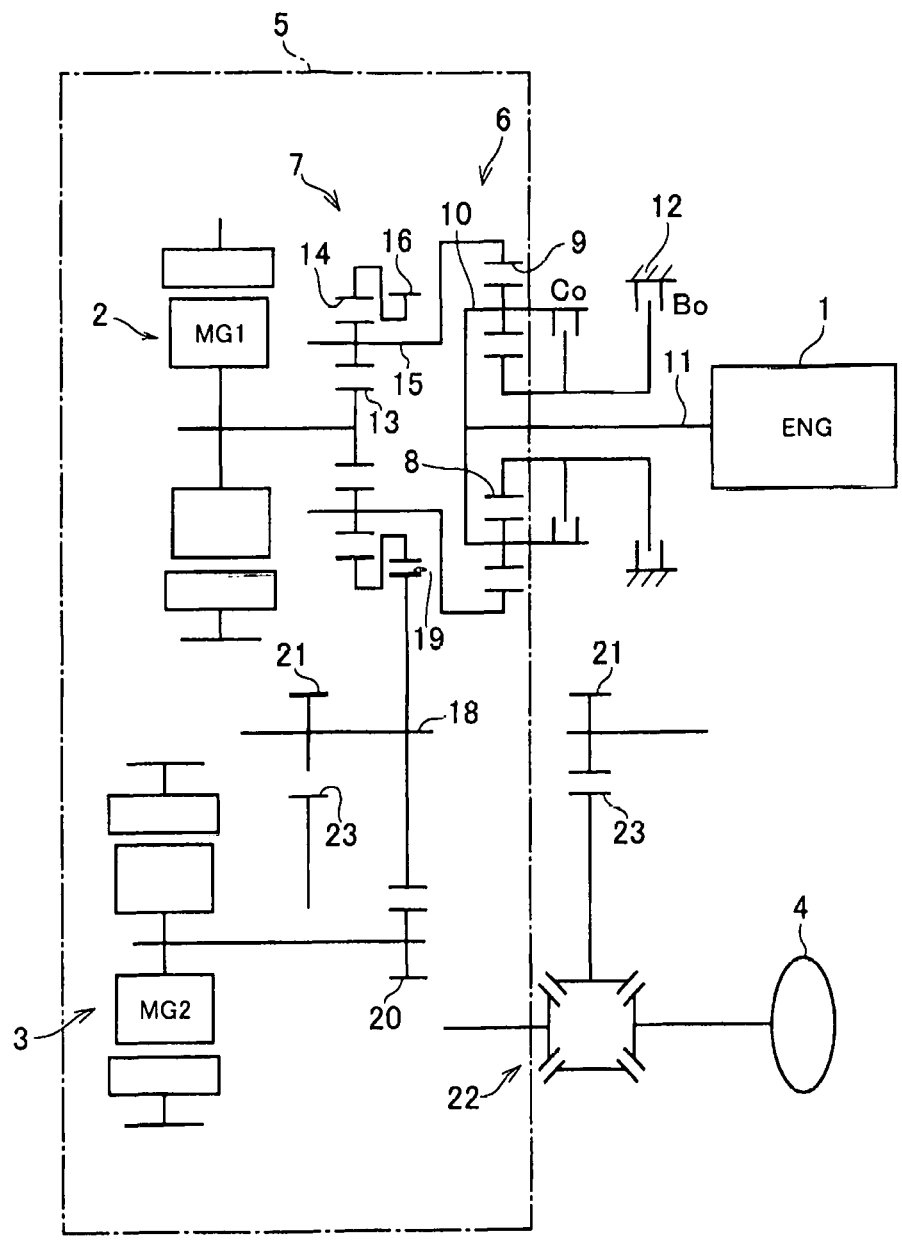

[Fig. 4]
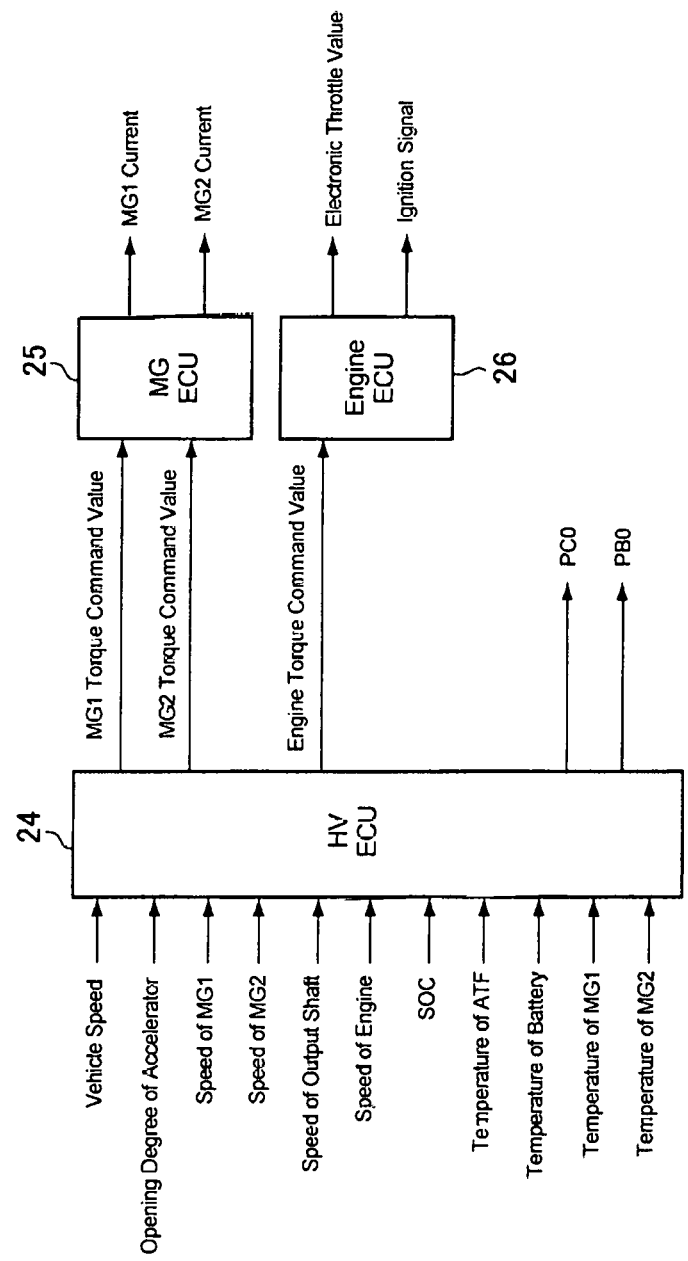

[Fig. 5]
| Drive Mode | | | C0 | B0 | MG1 | MG2 |
|---|---|---|---|---|---|---|
| EV | Forward | Single-Motor | △ | △ | G | M |
| | | Dual-Motor | O | O | M | M |
| | Backward | Single-Motor | | | | M |
| | | Dual-Motor | O | O | M | M |
| HV | Forward | Differential Low | O | | G | M |
| | | Differential High | | O | G | M |
| | Backward | Low | O | | G | M |
O: Engaged   △: Any of Those is Engaged to Generated Engine Braking Force
G: Mainly Operated as Generator   M: Mainly Operated as Motor
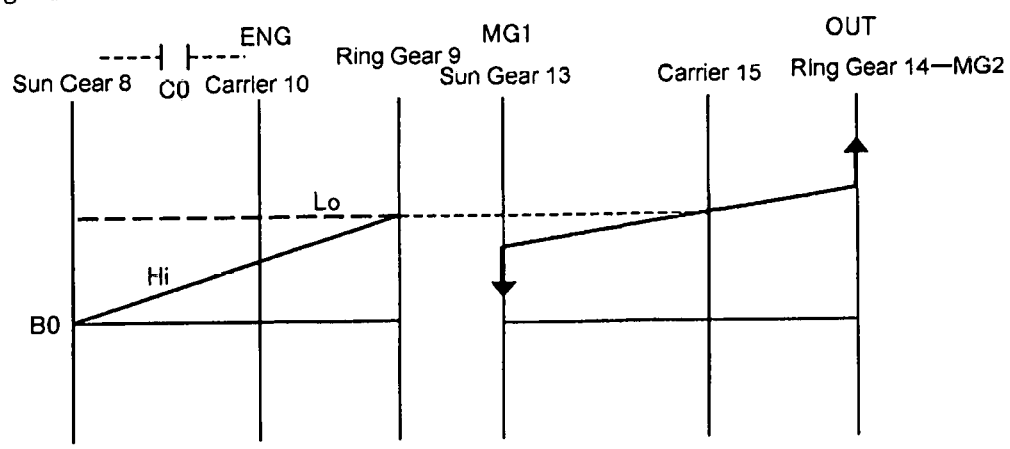
[Fig. 6]

[Fig. 7]
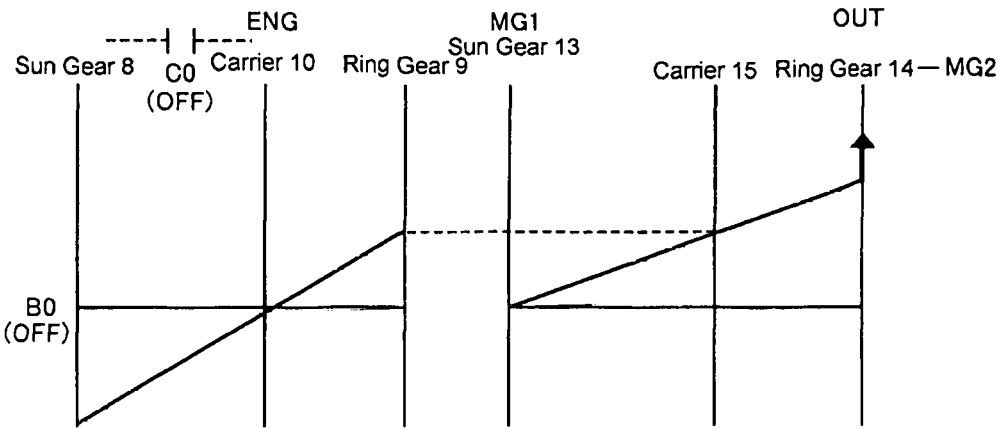
[Fig. 8]
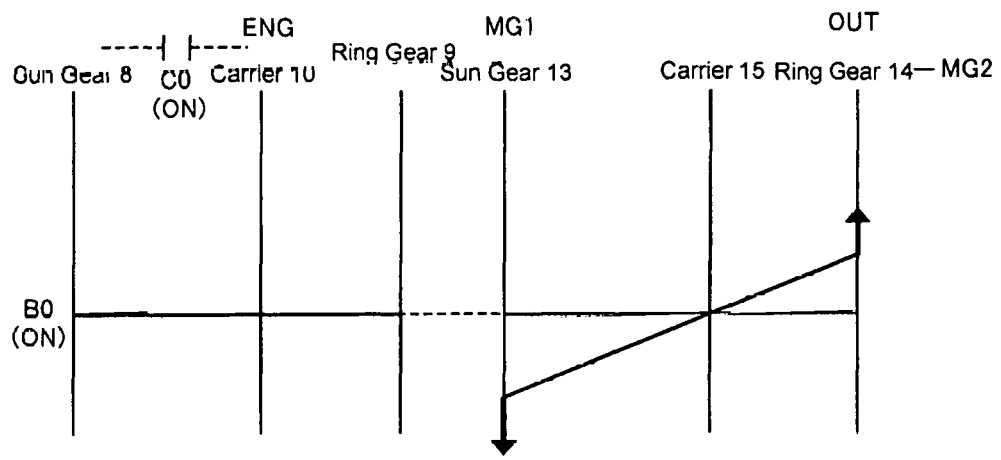
[Fig. 9]
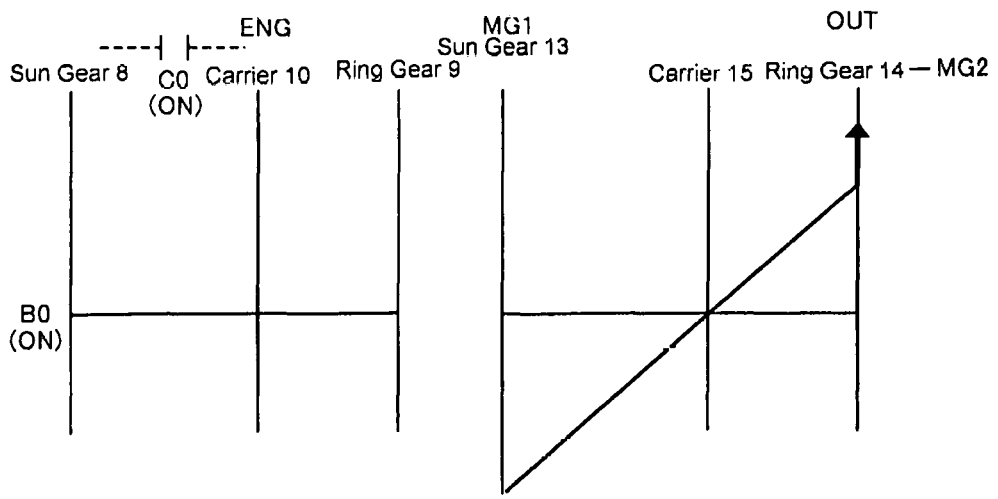

[Fig. 10]
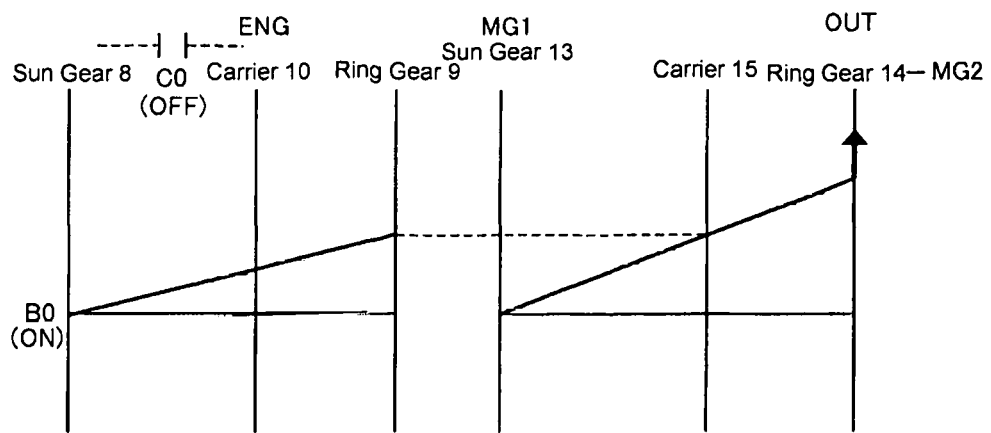
[Fig. 11]
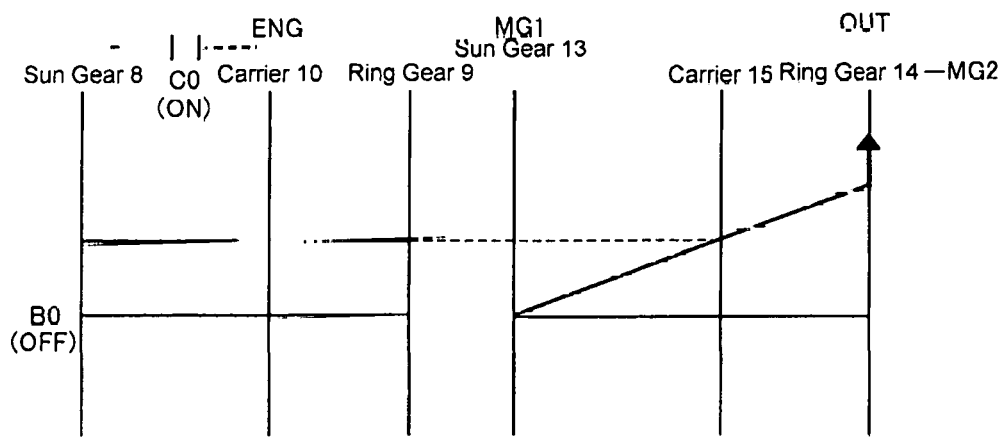

VEHICLE CONTROL SYSTEM

TECHNICAL FIELD

This invention relates to a control system for a vehicle which can be driven while halting an engine, and in which the engine can be restarted by motoring (or cranking) the engine while running the vehicle.

BACKGROUND ART

In the conventional art, a fuel supply to an engine is interrupted and the engine is disconnected from a powertrain to improve fuel economy, under a driving condition where neither a driving force nor a braking force is required. For example, Japanese Patent Publication No. 5141802 describes a hybrid drive system configured to stop the engine while disconnecting from a powertrain while running. According to the teachings of Japanese Patent Publication No. 5141802, a rotational speed of the engine is controlled by a first electric motor, and a second electric motor is operated by an electric power generated by the first electric motor. A power generated by the second electric motor is transmitted to an output shaft in addition to a power of the engine. The engine is connected with an overdrive mechanism through a clutch. The overdrive mechanism is a double pinion planetary gear mechanism in which a sun gear is halted, a carrier is connected with the output shaft of the engine through the low clutch, and a ring gear is connected with the output shaft through the high clutch.

In the hybrid drive system taught by Japanese Patent Publication No. 5141802, the carrier of the overdrive mechanism is connected with a carrier of a single-pinion planetary gear mechanism serving as a power distribution mechanism, and the first electric motor is connected with the sun gear of the power distribution mechanism. A ring gear of the power distribution mechanism serves as an output element, and the second electric motor is connected with the ring gear through an output side transmission.

Accordingly, in the hybrid drive system taught by Japanese Patent Publication No. 5141802, the engine is connected selectively with the carrier of the power distribution mechanism by engaging the low clutch or the high clutch. In this situation, given that a speed of the sun gear is varied by the first electric motor, the engine speed is changed in accordance with a speed of the ring gear governed by the vehicle speed and the speed of the sun gear. That is, the engine speed is controlled by the first electric motor. In this situation, the first electric motor may serve as a generator, and a generated electric power is supplied to the second electric motor to generate the driving force.

Given that the low clutch is engaged, the above-mentioned overdrive mechanism outputs an engine torque transmitted to the carrier thereof to the power distribution mechanism from the carrier. That is, a direct stage or a low stage is established in this situation. By contrast, given that the high clutch is engaged, the ring gear serves as an input element, the sun gear serves as a fixing element and the carrier serves as an output element. That is, an overdrive stage or a high stage is established. This means that the overdrive mechanism serves as a speed increasing mechanism. Provided that both of the low clutch and the high clutch are disengaged, the engine is disconnected from a downstream side of the overdrive mechanism. As described, the second electric motor is connected with the ring gear of the power distribution mechanism for transmitting the power to driving wheels. Therefore, the hybrid vehicle can be driven by supplying the electric power to the second electric motor even if the engine is disconnected from the powertrain. That is, the hybrid vehicle is driven under an EV mode.

As described, a power loss in the hybrid vehicle resulting from rotating the engine concurrently can be reduced by disengaging the clutches under the EV mode, that is, under the situation that neither the driving force nor the braking force of the engine is not especially required. Consequently, fuel efficiency (i.e., fuel consumption rate) and electric efficiency (i.e., electric consumption rate) are improved. Such control for disconnecting the engine from the powertrain may also be carried out in a vehicle other than the hybrid vehicle to improve the fuel efficiency if the engine can be disconnected from the powertrain in the vehicle.

The engine being stopped and disconnected from the powertrain is expected to be restarted while running the vehicle. However, there may be a situation in which an engagement device and a motor-generator or a motor may not be controlled as desired when restarting the engine. In this case, a shock may be caused if the engaging device is engaged completely after raising the speed of the engine. Otherwise, the shock may also be caused if the engaging device is engaged out of synchronization.

The present invention has been conceived nothing the foregoing technical problems, and it is an object to provide a vehicle control system for reducing shocks resulting from restarting an engine disconnected from a powertrain while the vehicle is running.

DISCLOSURE OF INVENTION

The vehicle control system of the present invention is applied to a vehicle comprising: an engine; a power transmission mechanism that delivers a drive force generated by the engine to driving wheels; an engagement device that selectively allows and interrupts a torque transmission between the engine and the power transmission mechanism; and a torque generating rotary device that is adapted to generate a drive force for propelling the vehicle and that is connected with the power transmission mechanism. In the vehicle, a first mode is selected to propel the vehicle by a drive force generated by the torque generating rotary device under the condition that the torque transmission between the engine and the power transmission mechanism is interrupted by disengaging the engagement device while stopping the engine. Meanwhile, a second mode is selected to propel the vehicle by the drive force generated by the torque generating rotary device under the condition that the torque transmission between the engine and the power transmission mechanism is allowed by engaging the engagement device while stopping the engine. In order to achieve the above-explained objective, according to the present invention, the vehicle control system is configured to select the second mode thereby propelling the vehicle by the drive force generated by the torque generating rotary device while allowing the torque transmission between the stopping engine and the power transmission mechanism, in case a control response of at least any of the engagement device and the torque generating rotary device is estimated to be out of a predetermine range under the condition that the vehicle is propelled while stopping the engine.

Specifically, the engagement device includes at least a first engagement device and a second engagement device. The power transmission mechanism of the vehicle is comprised of: a transmission that has an output member and an input member to which a power of the engine is inputted, and that establishes a predetermined stage in accordance with engagement statuses of the first and the second engagement devices; and a differential mechanism adapted to perform a differential action among at least an input element connected with the output member, a reaction element, and an output element that outputs the drive force to the driving wheels. In turn, the torque generating rotary device includes a first motor connected with the reaction element, and a second motor connected with the output element. Accordingly, the vehicle control system engages at least any one of the first engagement device and the second engagement device, and carries out a motoring of the engine by the first motor under the second mode.

The engagement device may be engaged and disengaged hydraulically. In this case, the estimation of a fact that the control response is to be out of the predetermine range is satisfied if a temperature of oil for actuating the engagement device is lower than a predetermined reference temperature.

More specifically, the torque generating rotary device includes a motor that is rotated by an electric power delivered from an electric storage device, and whose output is restricted depending on temperature. In this case, the estimation of the fact that the control response is to be out of the predetermine range is satisfied if a temperature of the motor is higher than a predetermined upper limit temperature.

In the transmission, a high stage where a speed ratio is small is established by engaging any one of the first and the second engagement devices, and a low stage where a speed ratio is larger than that of the high stage is established by engaging any of the other engagement device.

Thus, in the vehicle to which the control system of the present invention is applied, the torque generating rotary device is connected with the power transmission mechanism. Therefore, the vehicle car be powered by the torque generating rotary device while stopping the engine. In this situation, it is possible to cutoff the torque transmission between the engine and the power transmission mechanism by disengaging the engagement device. Otherwise, it is also possible to rotate the engine passively by allowing the torque transmission between the engine and the power transmission mechanism by engaging the engagement device. Therefore, a power loss is reduced under the first mode where the vehicle is propelled while disengaging the engagement device. When the engine is restarted under the first mode, a motoring of the engine is carried out by engaging the engagement device to transmit the torque from the power transmission mechanism to the engine. To this end, if the a control response of the engagement device or the torque generating rotary device is out of the predetermine range while propelling the vehicle by the drive force of the torque generating rotary device and stopping the engine, the drive mode is shifted to the second mode to allow the torque transmission between the engine and the power transmission mechanism by engaging the engagement device. Specifically, if the temperature of the oil for actuating the engagement device is low, or if the electric power supplied to the motor as the torque generating rotary device is low, the second mode is selected. Therefore, when the motoring is carried out to restart the engine, the engine has already been brought into a condition to transmit the torque with the power transmission mechanism. In this situation, the engine is allowed to be restarted only by delivering the fuel thereto while maintaining or increasing the output torque of the torque generating rotary device. That is, it is not necessary to control the engagement device and the output torque of the torque generating rotary device cooperatively. Therefore, even if the response of any of those controls is out of the predetermine range, the drive torque will not be changed significantly so that shocks can be reduced.

BRIEF DESCRIPTION OF DRAWINGS

FIG. 1 is a flowchart showing one example of the control to be carried out by the control system of the present invention.

FIG. 2 is a time chart schematically showing changes in an engine speed and a speed of each motor-generator under the condition that a drive mode is shifted from the second mode to the first mode as a result of temperature rise in oil.

FIG. 3 is a skeleton diagram schematically showing one example of a powertrain of a hybrid vehicle to which the present invention is applied.

FIG. 4 is a block diagram schematically showing one example of a control system of the hybrid vehicle to which the present invention is applied.

FIG. 5 is a table showing operating states of a clutch, a brake and motor-generators under each drive mode of the powertrain shown in FIG. 3.

FIG. 6 is a nomographic diagram showing a state of a power distribution device and a transmission shown in FIG. 3 under the condition that the vehicle is powered by the engine.

FIG. 7 is a nomographic diagram showing a state of the power distribution device and the transmission shown in FIG. 3 under the first mode of the single-motor mode.

FIG. 8 is a nomographic diagram showing a state of the power distribution device and the transmission shown in FIG. 3 under the dual-motor mode.

FIG. 9 is a nomographic diagram showing a state of the power distribution device and the transmission shown in FIG. 3 under the second mode of the single-motor mode where the clutch and the brake are engaged.

FIG. 10 is a nomographic diagram showing a state of the power distribution device and the transmission shown in FIG. 3 under the second mode of the single-motor mode where a brake is engaged.

FIG. 11 is a nomographic diagram showing a state of the power distribution device and the transmission shown in FIG. 3 under the second mode of the single-motor mode where the clutch is engaged.

BEST MODE FOR CARRYING OUT THE INVENTION

The control system of the present invention is applied to a vehicle in which a prime mover is comprised of an engine and a torque generating rotary device. In the vehicle of this kind, an internal combustion engine such as a gasoline engine and a diesel engine may be used as the engine. Specifically, the "torque generating rotary device" is a power unit that is rotated by the energy to generate a torque. Accordingly, the torque generating rotary device includes a motor, a motor-generator, and a flywheel rotated by a regenerative energy (the motor-generator may simply be called the "motor"). That is, the driving force control system of the present invention is applied to a hybrid vehicle comprised of at least two motors. In the hybrid vehicle of this kind, for example, one of the motors is used mainly to control a rotational speed and a torque of the engine, and the other motor is used mainly to generate a drive force.

The hybrid vehicle to which the control system is applied may be powered not only by the engine but also by the motor. Under the drive mode for propelling the vehicle by the engine power, the engine power is partially delivered to driving wheels while operating the first motor-generator by the remaining power to generate an electric power for operating the second motor-generator. In this case, alternatively, the engine power may also be used to operate a generator so as to operate the motor by the generated electric power. Meanwhile, the drive mode for propelling the vehicle by the electric power may be established by operating not only one of the motors but also both of the motors by delivering the electric power thereto from an electric storage device such as a battery.

Referring now in more detail to the drawings, FIG. 3 shows a preferred example of a powertrain of the hybrid vehicle. As shown in FIG. 3, a prime mover of the hybrid vehicle is comprised of an engine (ENG) 1, and two motor-generators (MG1, MG2) 2, 3. In the example, a drive force generated by the engine 1 is transmitted selectively to a power transmission mechanism 5 thereby delivering the drive force to driving wheels 4.

The power transmission mechanism 5 is comprised of a transmission 6 adapted to shift a gear stage thereof between at least a high stage and a low stage, and a power distribution device 7 that distributes the power transmitted from the engine 1 through the transmission 6 to the first motor-generator 2 side and to an output side. For example, a geared transmission, a roller-type transmission, a belt-driven transmission and so on may be used as the transmission 6, and in the example shown in FIG. 3, a single-pinion planetary gear unit is employed as the transmission 6. As the conventional single-pinion type planetary gear unit, the transmission 6 is comprised of a sun gear 8, a ring gear 9 as an internal gear arranged concentrically with the sun gear 8, a pinion gear(s) meshing with both the sun gear 8 and the ring gear 9, and a carrier 10 holding the pinion gear(s) in a manner such that the pinion gear(s) is/are allowed to rotate and revolve around the sun gear 8. The carrier 10 is connected with an output shaft 11 of the engine 1 to serve as an input member, the sun gear 8 serves as a reaction member, and the ring gear 9 serves as an output member.

A clutch C0 is arranged to selectively connect the sun gear 8 with the carrier 10, and a brake B0 is arranged to selectively halt the sun gear 8 by connecting the sun gear 8 with a predetermined fixing member 12 such as a casing. Thus, those clutch C0 and brake B0 serve as the engagement mechanism of the present invention, and to this end, a hydraulic frictional engagement device, an electromagnetic frictional engagement device, a dog clutch etc., may be used as the clutch C0 and brake B0. In the example show in FIG. 3, specifically, a hydraulic frictional engagement device is individually used as the clutch C0 and brake B0. Therefore, the sun gear 8 is connected with the carrier 10 to be rotated integrally by engaging the clutch C0, and consequently, the transmission 6 is rotated entirely integrally. By contrast, the sun gear 8 is halted by engaging the brake B0, and in this situation, the carrier 10 is rotated so that the ring gear 9 is rotated at a speed faster than that of the carrier 10. That is, in the transmission 6, a direct stage (i.e., a low stage) is established by engaging the clutch C0, and a high stage where a speed ratio is smaller than that of the direct stage is established by engaging the brake B0. Given that both of the clutch C0 and the brake B0 are disengaged, the sun gear 8 is allowed to be rotated freely. In this case, therefore, the drive force of the engine 1 is transmitted to the carrier 10 but it will not be transmitted to the power transmission mechanism 5 due to a torque drop of the sun gear 8. Thus, the clutch C0 and the brake B0 are used to connect the engine 1 selectively with the power transmission mechanism 5.

A differential mechanism, more specifically, a planetary gear unit having three rotary elements may be used as the power distribution device 7, and in the example shown in FIG. 3, a single-pinion type planetary gear unit is used as the power distribution device 7, and arranged coaxially with the engine 1. The first motor-generator 2 is arranged in the opposite side of the engine 1 across the power distribution device 7, and a sun gear 13 of the power distribution device 7 is connected with a rotor of the first motor-generator 2. In the power distribution device 7, a ring gear 14 is arranged concentrically with the sun gear 13, and a pinion gear(s) interposed between the sun gear 13 and the ring gear 14 while meshing therewith is/are supported by a carrier 15 while being allowed to rotate and revolve around the sun gear 13. The carrier 15 is connected with the ring gear 9 serving as an output member of the transmission 6, and the ring gear 14 is connected with a drive gear 16 disposed between the transmission 6 and the power distribution device 7.

A countershaft 18 is arranged in parallel with a common rotational center axis of the power distribution device 7 and the first motor-generator 2, and a counter driven gear 19 meshing with the drive gear 16 is fitted onto the countershaft 18 to be rotated integrally therewith. A diameter of the counter driven gear 19 is smaller than that of the drive gear 16 so that a rotational speed is reduced, that is, a torque is amplified during transmitting the torque from the power distribution device 7 to the countershaft 18.

The second motor-generator 3 is arranged in parallel with the countershaft 18 so that torque thereof can be added to the torque transmitted from the power distribution device 7 to the driving wheels 4. To this end, a reduction gear 20 connected with a rotor of the second motor-generator 3 is meshed with the counter driven gear 19. A diameter of the reduction gear 20 is larger than that of the counter driven gear 19 so that the torque of the second motor-generator 3 is transmitted to the counter driven gear 19 or the countershaft 18 while being amplified. Accordingly, a speed reduction ratio between the reduction gear 20 and the counter driven gear 19 can be increased, and mountability of the power train on a front-engine/front-drive vehicle can be improved.

In addition, a counter drive gear 21 is fitted onto the countershaft 18 in a manner to be rotated integrally therewith, and the counter drive gear 21 is meshed with a ring gear 23 of a differential gear unit 22 serving as a final reduction device. Note that a position of the differential gear unit 22 is displaced to the right side in FIG. 3 for the convenience of illustration.

In the powertrain shown in FIG. 3, each motor-generators 2 and 3 is connected individually with an electric storage device such as a battery through a not shown controller such as an inverter. Therefore, the motor-generators 2 and 3 are individually switched between a motor and a generator by controlling a current applied thereto. Meanwhile, an ignition timing of the engine 1 and an opening degree of the throttle valve are controlled electrically, and the engine 1 is stopped and restarted automatically.

Those controls are executed by an electronic control unit, and a control system of the preferred example is shown in FIG. 4. The control system is comprised of a hybrid control unit (as will be called HV-ECU hereinafter) 24 for controlling the vehicle entirely, a motor-generator control unit (as will be called MG-ECU hereinafter) 25 for controlling the motor-generators 2 and 3, and an engine control unit (as will be called E/G-ECU hereinafter) 26 for controlling the engine 1. Each control unit 24, 25 and 26 are individually composed mainly of a microcomputer configured to carry out a calculation based on input data and preinstalled data, and to output a calculation result in the form of a command signal. For example, a vehicle speed, an opening degree of an accelerator, a speed of the first motor-generator 2, a speed of the second motor-generator 3, a speed of the ring gear 14 (i.e., an output shaft speed), a speed of the engine 1, an SOC of the battery, a temperature of the oil (i.e., ATF), a temperature of the battery, a temperature of the first motor-generator (MG1) 2, a temperature of the second motor-generator (MG2) 3 and so on are inputted to the HV-ECU 24. Meanwhile, the HV-ECU 24 is configured to output a torque command for the first motor-generator 2, a torque command for the second motor-generator 3, a torque command for the engine 1, a hydraulic command PC0 for the clutch C0, and a hydraulic command PB0 for a brake B0 and so on.

The torque command for the first motor-generator 2 and the torque command for the second motor-generator 3 are sent to the MG-ECU 25, and the MG-ECU 25 calculates current commands to be sent individually to the first motor-generator 2 and the second motor-generator 3 using those input data. Meanwhile, the torque command for the engine 1 is sent to the E/G-ECU 26, and the E/G-ECU 26 calculates a command to control an opening degree of a throttle valve and a command to control an ignition timing using those input data, and the calculated commands are individually sent to an electronic throttle valve and ignition device (not shown).

Thus, according to this preferred example, the prime mover of the hybrid vehicle is comprised of the engine 1 and the motor-generators 2 and 3. As described, a connection of those elements of the prime mover may be changed arbitrarily so that a plurality of drive modes may be realized. The drive mode of the hybrid vehicle may be categorized generally into hybrid mode (abbreviated as "HV mode" hereinafter) and motor mode (abbreviated as "EV mode" hereinafter). Basically, under the HV mode, the engine 1 is driven and the power of the engine 1 is distributed to the first motor-generator 2 side and to the output side. The power distributed to the first motor-generator 2 is converted into an electric power by the first motor-generator 2 and delivered to the second motor-generator 3. Then, the electric power delivered to the second motor-generator 3 is converted into a mechanical power again by the second motor-generator 3 to be delivered to the driving wheels 4. By contrast, under the EV mode, the engine 1 is stopped and the vehicle is powered by any of the motor-generators 2 and 3.

Under the HV mode, the engine 1 is connected with the power transmission mechanism 5 by engaging the clutch C0 or the brake B0. Operating states of the clutch C0 and the brake B0 under the HV mode are shown in FIG. 5. Under the HV mode, specifically, the transmission 6 establishes the low stage or the high stage, the first motor-generator 2 is operated as a generator, and the second motor-generator 3 is operated as a motor.

As can be seen from the nomographic diagram shown in FIG. 6, under the HV mode, the torque of the engine 1 is transmitted to the carrier 10 of the transmission 6, and the carrier 10 is rotated at a same speed as the engine 1. In this situation, the high stage indicated by a solid line in FIG. 6 is established by engaging the brake B0 to halt the sun gear 8, and under the high stage, the ring gear serving as the output member is rotated at a speed higher than that of the engine 1. Meanwhile, the low stage indicated by a dashed line in FIG. 6 is established by engaging the clutch C0 instead of the brake B0, and under the low stage, the ring gear 9 is rotated at the same speed as the engine 1. Under the HV mode, in the power distribution device 7, the carrier 15 serving as the input element is rotated integrally with the ring gear 9. In this situation, if the first motor-generator 2 is operated as a generator to apply a torque to the sun gear 13 in a direction opposite to a torque acting on the carrier 15, a torque is applied to the ring gear 14 as the output member and the drive gear 16 integrated therewith while being amplified according to a gear ratio of the power distribution device 7 as the planetary gear mechanism (i.e., a ratio between numbers of tooth of the sun gear 13 and the ring gear 14). The torque thus amplified is further transmitted to the countershaft 18. An electric power generated by the first motor-generator 2 is delivered to operate the second motor-generator 3 as a motor, and a torque of the second motor-generator 3 is also transmitted to the countershaft 18. Additionally, when the vehicle is driven backwardly, the low stage is established by the transmission 6.

Under the EV mode, the vehicle may be powered not only by the second motor-generator 3 but also by both of the first and the second motor-generators 2 and 3. To this end, the engine 1 may not be kept connected to the power transmission mechanism 5 but also be disconnected from the power transmission mechanism 5. Here, definition of the term "connected" is a condition where the torque can be transmitted between the engine 1 and the power transmission mechanism 5, and definition of term "disconnected" is a condition where the torque cannot be transmitted between the engine 1 and the power transmission mechanism 5. Accordingly, under the EV mode, the drive mode may be further selected from a drive mode where both of the clutch C0 and the brake B0 are disengaged, and a drive mode where at least any of the clutch C0 and the brake B0 is engaged.

Provided that both of the clutch C0 and the brake B0 are disengaged under the EV mode, the sun gear 8 of the transmission 6 is allowed to rotate freely, that is, a reaction force will not be established. Therefore, even if the first motor-generator 2 is driven, a torque of the first motor-generator 2 will not be applied to the ring gear 14 and the drive gear 16 integrated therewith. That is, the torque is wasted by the sun gear 8. Accordingly, the vehicle is powered only by the second motor-generator 3. This drive mode is indicated as "Single-motor" in FIG. 5. Given that the vehicle is driven in a forward direction under the single-motor mode, an engine braking force may be established by engaging any one of the clutch C0 and the brake B0 while operating the first motor-generator 2 as a generator.

Details of the single-motor mode are shown in the nomographic diagram of FIG. 7. If the vehicle is drive in the forward direction under the single-motor mode, the second motor-generator 3 is rotated in the forward direction. Therefore, the ring gear 14 connected to the second motor-generator 3 through the reduction gear 20, the counter driven gear 19 and the drive gear 16 is rotated in the forward direction. In this situation, a speed of the first motor-generator 2 is reduced to zero so that the sun gear 13 is not rotated. Consequently, the carrier 15 is rotated at a speed lower than that of the ring gear 14. In this situation, since the carrier 15 is integrated with the ring gear 9 of the transmission 6, the ring gear 9 is also rotated in the forward direction. Meanwhile, since the engine 1 is stopped, a rotational speed of the carrier 10 of the transmission 6 is reduced to zero. Consequently, the sun gear 8 is rotated in the direction opposite to the rotational direction of the ring gear 9. Such drive mode corresponds to the first mode of the present invention.

The drive mode where at least any one of the clutch C0 and the brake B0 is engaged under the EV mode corresponds to the second mode of the present invention. The second mode may be established by engaging both of the clutch C0 and the brake B0, by engaging only the clutch C0, or by engaging only the brake B0. First of all, "Dual-motor" mode shown in FIG. 5 is to be explained. The dual-motor mode where both of the first and the second motor-generators 2 and 3 are operated as motors is established by engaging both of the clutch C0 and the brake B0, and details of the dual-motor mode are shown in the nomographic diagram of FIG. 8. Under the dual-motor mode, the sun gear 8 is connected with the carrier 10 to integrate the transmission 6, and the sun gear 8 is fixed by the brake B0 thereby fixing the transmission 6 entirely. Accordingly, the engine 1 is stopped.

Meanwhile, the carrier 15 of the power distribution device 7 is fixed together with the ring gear 6 of the transmission 6. In this situation, the power distribution device 7 as a planetary gear unit is allowed to serve as a transmission to change the speed according to a gear ratio thereof, by rotating the first motor-generator 2 in a direction opposite to the rotational direction of the ring gear 14 of the case that the vehicle is driven in the forward direction. Consequently, the torque of the first motor-generator 2 is changed according to the speed ratio established by the power distribution device 7 while being reversed in its rotational direction, and applied to the ring gear 14. The torque of the first motor-generator 2 thus changed while being reversed and the torque of the second motor-generator 3 are transmitted to the countershaft 18, and further delivered to the driving wheels 4. Those actions will not be changed even under a reverse running. Specifically, when the vehicle is driven in a backward direction, the rotational directions of the first and the second motor-generators 2 and 3 are reversed from those under the forward running. Thus, under the dual-motor mode, the torque can be transmitted between the engine 1 and the power transmission mechanism 5.

If a small drive force that can be achieved only by the second motor-generator 3 is required, the first motor-generator 2 is not necessarily to be controlled and rotated passively as shown in the nomographic diagram of FIG. 9.

Next, the drive mode achieved by engaging only the brake B0 will be explained with reference to the nomographic diagram of FIG. 10. This drive mode is established under the single-motor mode where the vehicle is powered only by the second motor-generator 3. In this case, the first motor-generator 2 is controlled in a manner such that the sun gear 13 of the power distribution device 7 is reduced to zero, and the ring gear 14 is rotated by the torque of the second motor-generator 3 in the forward direction. Consequently, the carrier 15 is rotated at the speed lower than that of the ring gear 14. In this situation, in the transmission 6, the ring gear 9 connected with the carrier 15 to be rotated integrally is also rotated in the forward direction, and the sun gear 8 is halted by the brake B0. Therefore, the carrier 10 and the engine 1 connected thereto are rotated at a speed lower than that of the ring gear 9. That is, the high stage is established by the transmission 6, and the engine 1 is rotated passively.

Under the second mode, if the clutch C0 is engaged instead of the brake B0, the low stage (i.e., the direct stage) is established by the transmission 6 so that the transmission 6 is rotated integrally as shown in the nomographic diagram of FIG. 11. In this situation, therefore, the engine 1 is also rotated passively.

Thus, the single-motor mode and the dual-motor mode may be selected under the EV mode, and the torque transmission between the engine 1 and the power transmission mechanism 5 may be allowed and interrupted selectively. Those drive modes and engagement states are selected in an optimally fuel and electric efficient manner while achieving the required drive force. For example, provided that the accelerator is opened widely to require a large drive force, the dual-motor mode is selected. By contrast, provided that a small drive force is required, the single-motor mode is selected. Under the single-motor mode, when the engine braking force is required, any of the clutch C0 and the brake B0 is engaged. In contrast, when it is necessary to reduce the power loss, both of the clutch C0 and the brake B0 are disengaged to disconnect the torque transmission between the engine 1 and the power transmission mechanism 5.

The control system of the present invention is configured to engage and disengage the engagement devices taking account of a control response of the engine 1. Referring now to FIG. 1, there is shown a flowchart of a preferred control example, and the HV-ECU 24 is configured to repeat the control example shown in FIG. 1 at predetermined short intervals. According to the control shown in FIG. 1, first of all, a control response of each element involved in a starting operation of the engine 1 under the EV mode such as the motor-generators 2 and 3, the clutch C0 and the brake B0 is individually determined or estimated. Specifically, it is determined whether or not an output of the battery is restricted (at step S1). For example, the output of the battery as an electric source of the motor-generators 2 and 3 is restricted if a temperature of the battery is high, if a state of charge (abbreviated as SOC hereinafter) is low, temperatures of the motor-generators 2 and 3 are high, or some sort of failure occurs. To this end, at step S1, is also possible to determine whether or not the temperature of each of the battery and the motor-generators 2 and 3 is individually larger than an upper limit values thereof, or whether or not the SOC of the battery is lower than a reference value.

If the output of the battery is not restricted so that the answer of step S1 is NO, it is determined whether or not a temperature of the oil for controlling the clutch C0 and the brake B0 (i.e., ATF) is higher than a threshold value or a reference temperature (at step S2). Viscosity of the oil is increased with a reduction in the oil temperature, and the control response of hydraulic devices such as the engagement devices get slower with the increase in the oil viscosity. Therefore, the threshold value used a step S2 is set to a low temperature it may deteriorate the control responses of those devices, based on a result of an experimentation or a simulation. In addition, an order of the determinations of steps S1 and S2 may be changed flexibly, and the determinations of steps S1 and S2 may also be carried out simultaneously.

If the temperature of the oil is higher than the reference temperature so that the answer of step S2 is YES, this means that the control response to restart the engine 1 under the EV mode is ensured. In this case, therefore, the above-explained first mode is selected (at step S3), and the routine is returned without carrying out any specific control. Specifically, the vehicle is powered only by the second motor-generator 3 while disengaging both of the clutch C0 and the brake B0. Under the first mode, the engine 1 is substantially disconnected from the power transmission mechanism 5 so that the engine 1 is not rotated concurrently. Therefore, power loss is reduced so that the fuel efficiency and the electric efficiency are improved. When the engine 1 is restarted, any one of the clutch C0 and the brake B0 is engaged and the torques of the motor-generators 2 and 3 are controlled. In this situation, however, the factors to deteriorate the control response such as the oil temperature and the SOC of the battery are ensured at sufficient level so that the engine 1 is allows to be restarted without causing or deteriorating shocks.

In contrast, if control response cannot be ensured, that is, if the answer of step S1 is YES or if the answer of step S3 is NO, the second mode of the EV mode is selected (at step S4). Specifically, the engine 1 is connected with the power transmission mechanism 5 to transmit the torque therebetween by engaging at least any one of the clutch C0 and the brake B0, and the vehicle is powered by the second motor-generator 3 or by both of the motor-generators 2 and 3. Thus, when restarting the engine 1 under the second mode, the engine 1 is connected with the power transmission mechanism 5. In this situation, therefore, the first motor-generator 2 is controlled in a manner to establish a torque required to carry out a motoring of the engine 1, and the second motor-generator 3 is controlled in a manner not to change the drive torque significantly. This means that it is not necessary to carry out the hydraulic control and the motor torque control cooperatively. Therefore, even if the response of any of those controls is out of predetermine range due to some sort of failure, the drive torque will not be changed significantly and shocks will be reduced.

As described, the second mode can be established not only by engaging the clutch C0 but also by engaging the brake B0. To this end, the control system of the present invention is configured to select the engagement device to be engaged to establish the second mode. Specifically, after the second mode is determined to be established at step S4, it is determined whether or not a vehicle speed is faster than a reference speed or a threshold value (at step S5). The reference speed is used to determine whether or not the engine speed is raised excessively after a completion of the restarting of the engine 1, and for this purpose, the reference speed is determined based on an experimental result.

If the vehicle speed is higher than the reference speed so that the answer of step S5 is YES, the high stage of the transmission 6 is selected (at step S6), and then the routine is returned. In this case, specifically, the brake B0 is engaged. By contrast, if the vehicle speed is lower than the reference speed so that the answer of step S5 is NO, the low stage of the transmission 6 is selected (at step S7), and then the routine is returned. In this case, the clutch C0 is engaged. Thus, the control system of the preferred example is configured to select the speed ratio of the transmission 6 depending on the vehicle speed when restarting the engine 1 under the EV mode. Therefore, the engine speed will not be raised excessively after the completion of the restarting of the engine 1 so that the power loss will not be increased.

When the accelerator pedal is depressed, or when the SOC of the battery is insufficient under the dual-motor mode of the EV mode, the engine 1 is required to be restarted As described, under the dual-motor mode, both of the clutch C0 and the brake B0 are engaged while halting the rotation of the engine 1. Therefore, in as order to restart the engine 1, a motoring of the engine 1 is carried out by disengaging the brake B0 while keeping the clutch C0 to be engaged, and then gradually increasing the speed of the second motor-generator 3. In this case, the engine 1 is thus restarted under the second mode by merely draining the oil from the brake B0 to disengage the brake B0. Therefore, even if the oil temperature is low and the control response is thereby deteriorated, shocks resulting from restarting the engine 1 can be reduced.

FIG. 2 is a time chart showing changes in speeds of the engine 1 and the motor-generators 2 and 3, and changes in oil pressures of the clutch C0 and the brake B0, under the condition that the control of the preferred example is carried out by the control system of the present invention. Specifically, FIG. 2 shows an example in which the vehicle runs downhill without operating the accelerator and the brake. In addition, in the example shown in FIG. 2, the oil temperature is low and the second mode is therefore selected, the vehicle speed is lower than the reference speed and the low stage is therefore established in the transmission 6 by engaging the clutch C0, the second motor-generator 3 is operated as a generator to regenerate energy, the engine 1 is stopped so that the torque of the first motor-generator 2 is rotated backwardly, that is, the torque of the first motor-generator 2 is zero.

In the example shown in FIG. 2, the speed of the vehicle running downhill increases gradually and exceeds the reference speed (at point t1), and at this point, a determination to shift the gear stage of the transmission 6 from the low stage to the high stage is satisfied. Consequently, the oil pressure of the clutch C0 is reduced at a predetermined gradient to disengage the clutch C0, and the oil pressure of the brake B0 is increased at a predetermined gradient. When a determination to start the engine 1 under the high stage established by thus disengaging the clutch C0 and engaging the brake B0 (at point T2), the torque of the first motor-generator 2 is increased to carry out a motoring of the engine 1. In this situation, a torque compensation is carried out by the second motor-generator 3 in a manner to reduce a pulsation in the torque rotating the driving wheels 4. In the example shown in FIG. 2, specifically, a regeneration torque of the second motor-generator 3 is reduced. In this situation, the engine 1 has already been connected with the power transmission mechanism 5 to transmit the torque therebetween. Therefore, the hydraulic controls of the clutch C0 and the brake B0 is not necessarily to be carried out cooperatively with the electric controls of the motor-generators 2 and 3. For this reason, even if the oil temperature is low thereby deteriorating the control response, shocks resulting from restarting the engine 1 will not be worsened.

When the rotational speed of the first motor-generator 2 becomes zero (at point t3), the torque of the first motor-generator 2 is controlled in a manner such that the speed thereof is maintained to zero. In this situation, since the vehicle speed is increasing, the speed of the engine 1 is increased according to the vehicle speed. Meanwhile, the torque of the first motor-generator 2 is reduced to maintain the speed thereof to zero, and the regeneration torque of the second motor-generator 3 is increased.

When the oil temperature (ATF) exceeds the upper limit temperature (at point t4), the factor to deteriorate the control response relating the restarting the engine 1 is eliminated. In this situation, therefore, the control system determines as YES at the above-explained step S2 so that the drive mode is shifted from the second mode of the EV mode to the first mode. As described, under the first mode, the torque transmission between the engine 1 and the power transmission mechanism 5 or the power distribution device 7 is cutoff, and the second motor-generator 3 generates the drive force while establishing the regeneration torque. To this end, the brake B0 being engaged is disengaged while maintaining the clutch C0 to be disengaged. Specifically, the oil pressure applied the brake B0 is reduced at the predetermined gradient.

When the brake B0 is disengaged (at point t5), the first mode is established. Under the first mode, the sun gear 8 of the transmission 6 is allowed to rotate freely so that the carrier 15 of the power distribution device 7 integrated with the ring gear 9 of the transmission 6 is also allowed to rotated freely. Consequently, an operating condition of the power distribution device 7 is not restricted to a specific condition and power distribution device 7 is allowed to achieve different condition simultaneously. That is, the engine 1 and the first motor-generator 2 are disconnected from the driving wheels 4 in view of torque transmission. In other words, in the prime mover, only the second motor-generator 3 is connected with the driving wheel 4 so that a regeneration amount of the second motor-generator 3 is increased. Thus, the oil temperature and the SOC of the battery affecting on the control response fall within the predetermined limits, and an amount of the regeneration energy can be increased as much as possible. Therefore, it is possible to reduce the shocks resulting from restarting the engine 1 while optimizing the fuel efficiency and the electric efficiency.

The present invention should not be limited to the foregoing preferred example. For example, the control system of the present invention may also be applied to a vehicle in which the engagement device is interposed between the engine and the power transmission mechanism to selectively transmit the torque therebetween.

The invention claimed is:

1. A vehicle control system, which is applied to a vehicle comprising:
   an engine;
   a power transmission mechanism that delivers a drive force generated by the engine to driving wheels;
   an engagement device that selectively allows and interrupts a torque transmission between the engine and the power transmission mechanism; and
   a torque generating rotary device that is adapted to generate a drive force for propelling the vehicle and that is connected with the power transmission mechanism;
   a first mode, which is selected to propel the vehicle by a drive force generated by the torque generating rotary device under the condition that the torque transmission between the engine and the power transmission mechanism is interrupted by disengaging the engagement device while stopping the engine; and
   a second mode, which is selected to propel the vehicle by the drive force generated by the torque generating rotary device under the condition that the torque transmission between the engine and the power transmission mechanism is allowed by engaging the engagement device while stopping the engine;
   wherein the vehicle control system is configured to select the second mode thereby propelling the vehicle by the drive force generated by the torque generating rotary device while allowing the torque transmission between the stopping engine and the power transmission mechanism, when a control response of the engagement device is estimated to be out of a predetermined range under the condition that the vehicle is propelled while stopping the engine.

2. The vehicle control system as claimed in claim 1,
   wherein the engagement device includes at least a first engagement device and a second engagement device;
   wherein the power transmission mechanism is comprised of
      a transmission that has an output member and an input member to which a power of the engine is inputted, and that establishes a predetermined stage in accordance with engagement statuses of the first and the second engagement devices, and
      a differential mechanism adapted to perform a differential action among at least an input element connected with the output member, a reaction element, and an output element that outputs the drive force to the driving wheels;
   wherein the torque generating rotary device includes a first motor connected with the reaction element, and a second motor connected with the output element; and
   wherein the vehicle control system is configured to engage at least any one of the first engagement device and the second engagement device and to carry out a motoring of the engine by the first motor under the second mode.

3. The vehicle control system as claimed in claim 2,
   wherein the transmission is adapted to establish a high stage where a speed ratio is small by engaging any one of the first and the second engagement devices, and to establish a low stage where a speed ratio is larger than that of the high stage by engaging any of the other engagement device.

4. The vehicle control system as claimed in claim 1,
   wherein the engagement device is engaged and disengaged hydraulically: and
   wherein the estimation of a fact that the control response is to be out of the predetermined range is satisfied if a temperature of oil for actuating the engagement device is lower than a predetermined reference temperature.

5. A vehicle control system, which is applied to a vehicle comprising:
   an engine;
   a power transmission mechanism that delivers a drive force generated by the engine to driving wheels;
   an engagement device that selectively allows and interrupts a torque transmission between the engine and the power transmission mechanism; and
   a torque generating rotary device that is adapted to generate a drive force for propelling the vehicle and that is connected with the power transmission mechanism;
   a first mode, which is selected to propel the vehicle by a drive force generated by the torque generating rotary device under the condition that the torque transmission between the engine and the power transmission mechanism is interrupted by disengaging the engagement device while stopping the engine; and
   a second mode, which is selected to propel the vehicle by the drive force generated by the torque generating rotary device under the condition that the torque transmission between the engine and the power transmission mechanism is allowed by engaging the engagement device while stopping the engine;
   wherein the vehicle control system is configured to select the second mode thereby propelling the vehicle by the drive force generated by the torque generating rotary device while allowing the torque transmission between the stopping engine and the power transmission mechanism, when a control response of the torque generating rotary device is estimated to be out of a predetermined range under the condition that the vehicle is propelled while stopping the engine.

6. The vehicle control system as claimed in claim 5,
   wherein the torque generating rotary device includes a motor that is rotated by an electric power delivered from an electric storage device, and whose output is restricted depending on temperature; and
   wherein the estimation of the fact that the control response is to be out of the predetermined range is satisfied if a temperature of the motor is higher than a predetermined upper limit temperature.

7. The vehicle control system as claimed in claim 5,
wherein the engagement device includes at least a first engagement device and a second engagement device;
wherein the power transmission mechanism is comprised of
a transmission that has an output member and an input member to which a power of the engine is inputted, and that establishes a predetermined stage in accordance with engagement statuses of the first and the second engagement devices, and
a differential mechanism adapted to perform a differential action among at least an input element connected with the output member, a reaction element, and an output element that outputs the drive force to the driving wheels;
wherein the torque generating rotary device includes a first motor connected with the reaction element, and a second motor connected with the output element; and
wherein the vehicle control system is configured to engage at least any one of the first engagement device and the second engagement device and to carry out a motoring of the engine by the first motor under the second mode.

8. The vehicle control system as claimed in claim 7,
wherein the transmission is adapted to establish a high stage where a speed ratio is small by engaging any one of the first and the second engagement devices, and to establish a low stage where a speed ratio is larger than that of the high stage by engaging any of the other engagement devices.

* * * * *